(12) United States Patent
Zhu et al.

(10) Patent No.: US 12,262,198 B2
(45) Date of Patent: Mar. 25, 2025

(54) DATA TRANSMISSION METHOD AND DEVICE

(71) Applicant: HUAWEI TECHNOLOGIES CO., LTD., Guangdong (CN)

(72) Inventors: Chong Zhu, Xi'an (CN); Feng Liu, Wuhan (CN); Zhipeng Wu, Wuhan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 328 days.

(21) Appl. No.: 17/868,416

(22) Filed: Jul. 19, 2022

(65) Prior Publication Data

US 2022/0353675 A1     Nov. 3, 2022

Related U.S. Application Data

(63) Continuation of application No. PCT/CN2021/070285, filed on Jan. 5, 2021.

(30) Foreign Application Priority Data

Jan. 21, 2020   (CN) .......................... 202010072761.3

(51) Int. Cl.
*H04W 12/037*   (2021.01)
*H04L 9/08*   (2006.01)
(Continued)

(52) U.S. Cl.
CPC ......... *H04W 12/037* (2021.01); *H04L 9/0838* (2013.01); *H04L 9/14* (2013.01);
(Continued)

(58) Field of Classification Search
CPC ....... H04L 9/08; H04L 9/0816; H04L 9/0838; H04L 9/14; H04W 12/03; H04W 12/037;
(Continued)

(56) References Cited

U.S. PATENT DOCUMENTS

2009/0262937 A1*  10/2009  Hirth ..................... H04L 9/0891
                                                                        380/256
2014/0201520 A1    7/2014  Yacobi
(Continued)

FOREIGN PATENT DOCUMENTS

CN          1433608 A       7/2003
CN        102427457 A       4/2012
(Continued)

OTHER PUBLICATIONS

Office Action in Chinese Appln. No. 202010072761.3, dated Apr. 19, 2021, 17 pages (with English translation).
(Continued)

*Primary Examiner* — D'Arcy Winston Straub
(74) *Attorney, Agent, or Firm* — Fish & Richardson P.C.

(57) ABSTRACT

A data transmission method and a device are provided. When determining that the first network element and the second network element is disconnected, the first network element stores identification information of the last frame of data and connection status information that are transmitted before the connection is disconnected. When determining a condition for re-communication is meet, the first network element generates a third key based on a first key and a second key, where the first key is a key used to transmit the last frame of data, and the second key includes a key used by the first network element and the second network element to transmit each of j frames of data before the last frame of data. The first network element communicates with the second network element based on the third key, identification information of an $i^{th}$ frame of data, and the connection status information.

20 Claims, 5 Drawing Sheets

(51) Int. Cl.
*H04L 9/14* (2006.01)
*H04W 12/03* (2021.01)
*H04W 12/041* (2021.01)
*H04W 12/0431* (2021.01)
*H04W 12/0433* (2021.01)
*H04W 76/19* (2018.01)
*H04W 84/12* (2009.01)

(52) U.S. Cl.
CPC ......... *H04W 12/03* (2021.01); *H04W 12/041* (2021.01); *H04W 12/0431* (2021.01); *H04W 12/0433* (2021.01); *H04W 76/19* (2018.02); *H04W 84/12* (2013.01)

(58) Field of Classification Search
CPC . H04W 12/04; H04W 12/041; H04W 12/043; H04W 12/0431; H04W 12/0433; H04W 84/12
See application file for complete search history.

(56) References Cited

U.S. PATENT DOCUMENTS

| | | | | |
|---|---|---|---|---|
| 2016/0381718 | A1* | 12/2016 | Ahuja | H04W 76/10 370/338 |
| 2017/0064760 | A1 | 3/2017 | Kandagadla et al. | |
| 2019/0037395 | A1 | 1/2019 | Lehtovirta et al. | |
| 2019/0305892 | A1* | 10/2019 | He | H04L 1/1621 |
| 2020/0015164 | A1* | 1/2020 | Asterjadhi | H04W 52/0229 |
| 2020/0120134 | A1* | 4/2020 | Hill | H04L 63/0485 |

FOREIGN PATENT DOCUMENTS

| | | |
|---|---|---|
| CN | 103313242 A | 9/2013 |
| CN | 103888941 A | 6/2014 |
| CN | 104683359 A | 6/2015 |
| CN | 105656875 A | 6/2016 |
| CN | 105812313 A | 7/2016 |
| CN | 106912045 A | 6/2017 |
| CN | 107852606 A | 3/2018 |
| CN | 109120405 A | 1/2019 |
| CN | 109391938 A | 2/2019 |
| CN | 111083804 A | 4/2020 |

OTHER PUBLICATIONS

International Search Report and Written Opinion in International Appln. No. PCT/CN2021/070285, mailed on Apr. 1, 2021, 17 pages (with English translation).

Office Action in Chinese Appln. No. 202010072761.3, dated Nov. 17, 2021, 6 pages (with English translation).

* cited by examiner

DATA TRANSMISSION METHOD AND DEVICE

CROSS-REFERENCE TO RELATED APPLICATIONS

This application is a continuation of International Application No. PCT/CN2021/070285, filed on Jan. 5, 2021, which claims priority to Chinese Patent Application No. 202010072761.3, filed on Jan. 21, 2020, both of which are hereby incorporated by reference in their entireties.

TECHNICAL FIELD

This application relates to the communications field, and in particular, to a data transmission method and a device.

BACKGROUND

Rapid development of communications technologies brings wide application of multi-device joint networking. A device on a network is usually referred to as a network element. A physical connection may be directly or indirectly established between network elements (or referred to as nodes, nodes) wirelessly or wiredly, and is used for data transmission between the network elements. For example, FIG. 1 is a schematic diagram of typical device joint networking. As shown in FIG. 1, a physical connection is directly established between a network element 1 and a network element 2. The physical connection may be established wirelessly (for example, through radio frequency communication) or wiredly (for example, by using a power line or a network cable). Data transmission may be implemented between the network element 1 and the network element 2 based on the established physical connection. A manner of performing communication based on the physical connection established wirelessly may be referred to as wireless communication.

In network communication, security of data transmission between two network elements usually needs to be ensured, especially in wireless communication. This is because a carrier for wireless communication is an electromagnetic wave, and the electromagnetic wave radiates to the air in an open environment. Any device having a matching receiver can receive a corresponding signal within a radiation range. Therefore, data transmission security in wireless communication is more important. In view of this, in the conventional technology, after a physical connection is established between network elements, key negotiation usually needs to be performed. For example, key negotiation may be performed between the network elements by using a four-way handshake, to establish a data communication link between the network elements. Based on the established data communication link, encrypted data communication may be performed between the network elements by using the key obtained through negotiation, to ensure communication security.

After the connection such as the foregoing physical connection or the foregoing data communication link between the network elements is disconnected, communication between the network elements is interrupted. If a condition for re-communication is met, a key negotiation process needs to be performed again to restore the data communication link, and then re-communication can be performed. Consequently, performing re-communication needs to consume a relatively long period of time. In addition, in wireless communication, wireless signals interfere with each other due to openness thereof. Therefore, when the key negotiation process is performed again, key negotiation may fail due to interference from another wireless signal, and consequently the data communication link fails to be restored. In other words, when the key negotiation process is performed again, there is a risk of failure, and consequently the network elements cannot communicate with each other again.

SUMMARY

Embodiments of this application provide a data transmission method and a device, to resolve a problem that there is a risk of failure because performing re-communication needs to consume a long period of time after a connection (for example, a physical connection or a data communication link) between network elements is disconnected.

To resolve the foregoing problem, the following technical solutions are used in this application.

According to a first aspect, an embodiment of this application provides a data transmission method. The method may be applied to a first network element, the first network element and a second network element has successfully established a connection, and has completed initial key negotiation, and the method may include: When determining that the first network element and the second network element is disconnected, the first network element stores identification information of an $i^{th}$ frame of data and connection status information transmitted before the connection is disconnected, where the $i^{th}$ frame of data is the last frame of data transmitted between the first network element and the second network element before the connection is disconnected. For example, the $i^{th}$ frame of data may be data sent by the first network element to the second network element before the connection is disconnected, or may be data received by the first network element from the second network element before the connection is disconnected. When determining that the first network element and the second network element meet a condition for re-communication, the first network element generates a third key based on a first key and a second key that are stored in the first network element, where the first key is a key used to transmit the $i^{th}$ frame of data, and i is an integer greater than or equal to 1; and the second key includes a key used by the first network element and the second network element to transmit each of j frames of data before the $i^{th}$ frame of data, and j is an integer greater than or equal to 0 and less than or equal to i−1. The first network element communicates with the second network element based on the third key, the identification information of the $i^{th}$ frame of data, and the connection status information.

In the foregoing technical solution, network elements have established a physical connection, and have performed a key negotiation process. After a data communication link is established, a used key, identification information of a last frame of data that is transmitted before the connection is disconnected, and connection status information transmitted before the connection is disconnected are stored in a process of communication between the network elements, so that when a condition for re-communication is met after the connection between the network elements is disconnected, the data communication link can be restored without performing the key negotiation process again. This resolves a problem that the network elements need to consume a long period of time to communicate with each other again after the connection between the network elements is disconnected, and reduces a risk of failure.

In a possible implementation, when determining that the first network element sends the disconnection signaling to the second network element, the first network element may determine that the connection between the first network element and the second network element is disconnected. In another possible implementation, when determining that the first network element receives disconnection signaling sent by the second network element, the first network element may determine that the connection between the first network element and the second network element is disconnected. The disconnection signaling may be used to indicate to disconnect the connection between the first network element and the second network element. After the first network element sends the disconnection signaling to the second network element, or the first network element receives the disconnection signaling from the second network element, the data communication link between the network elements is disconnected, and the communication between the network elements stops.

In another possible implementation, the first key may be stored in the first network element after the first network element generates the first key. Similarly, the second key may be stored in the first network element after the second network element generates the corresponding key.

In another possible implementation, when determining that response data returned by the second network element is not received within a preset time after the first network element sends the $i^{th}$ frame of data to the second network element, the first network element determines that the connection between the first network element and the second network element is disconnected. Alternatively, when determining that data sent by the second network element is not received within a preset time after the first network element receives the $i^{th}$ frame of data sent by the second network element, the first network element determines that the connection between the first network element and the second network element is disconnected. The first network element may determine a time for performing communication last time, a sent frame fails for a long time, or the like, to determine whether the physical connection between the network elements is disconnected. After the physical connection is disconnected, the data communication link between the network elements is also disconnected, and the communication stops.

In still another possible implementation, that the first network element and the second network element meet a condition for re-communication includes: The first network element sends connection signaling to the second network element. In still another possible implementation, that the first network element and the second network element meet a condition for re-communication includes: The first network element receives connection signaling from the second network element. The connection signaling is used to indicate to establish a connection between the first network element and the second network element. When the first network element sends the connection signaling to the second network element or receives the connection signaling from the second network element, it indicates that the first network element and the second network element need to communicate with each other again, or the condition for re-communication is met.

In still another possible implementation, that the first network element and the second network element meet a condition for re-communication includes: The first network element is connected to the second network element through a cable, or the second network element is located in a wireless network radiation area of the first network element. When the first network element is connected to the second network element through the cable, or the second network element is located in the wireless network radiation area of the first network element, it indicates that the network elements need to communicate with each other again, or the condition for re-communication is met.

In still another possible implementation, that the first network element communicates with the second network element based on the third key, the identification information of the $i^{th}$ frame of data and the connection status information includes: The first network element generates an $(i+1)^{th}$ frame of data based on the identification information of the $i^{th}$ frame of data and the connection status information, encrypts the $(i+1)^{th}$ frame of data by using the third key, and sends the encrypted $(i+1)^{th}$ frame of data to the second network element. Alternatively, the first network element receives an $(i+1)^{th}$ frame of data from the second network element, decrypts the $(i+1)^{th}$ frame of data by using the third key, generates response data of the $(i+1)^{th}$ frame of data based on the identification information of the $i^{th}$ frame of data and the connection status information, and sends the response data to the second network element, where the response data is used to indicate whether the $(i+1)^{th}$ frame of data is successfully received.

In still another possible implementation, the identification information of the $i^{th}$ frame of data includes: a frame sequence number and a sequence control field; the connection status information includes: a quantity of received and sent frames and a connection status; and the connection status is used to indicate that the first network element is connected to the second network element.

It should be noted that, when determining that the connection between the first network element and the second network element is disconnected, the second network element also stores the identification information of the last frame of data that is transmitted before the connection is disconnected and the connection status information transmitted before the connection is disconnected. In addition, due to peer-to-peer communication, the information stored in the second network element is the same as that stored in the first network element. A specific implementation in which the second network element performs the method provided in this embodiment is similar to that of the first network element, and details are not described herein again in this embodiment.

According to a second aspect, an embodiment of this application provides a network element, and the network element may be a first network element in this application. The network element may include: one or more processors, a memory, and a communications module. The memory is configured to store one or more programs. The one or more processors are configured to run the one or more programs, so that the network element performs the data transmission method according to any one of the first aspect or the possible implementations of the first aspect.

According to a third aspect, an embodiment of this application provides a computer-readable storage medium, including computer instructions. When the computer instructions are run on a network element, the network element performs the data transmission method according to any one of the first aspect or the possible implementations of the first aspect.

According to a fourth aspect, an embodiment of this application provides a computer program product. When the computer program product is run on a computer, the computer performs the data transmission method according to any one of the first aspect or the possible implementations of the first aspect.

According to a fifth aspect, an embodiment of this application provides an apparatus. The apparatus has a function of implementing behavior of the first network element in the method in the first aspect. The function may be implemented by hardware, or may be implemented by executing corresponding software by hardware. The hardware or the software includes one or more modules corresponding to the foregoing functions, for example, a storage unit or module, a generating unit or module, a communications unit or module, and a determining unit or module.

It should be noted that the network element in the second aspect, the computer-readable storage medium in the third aspect, the computer-readable storage medium in the fourth aspect, and the apparatus in the fifth aspect of this application are configured to perform the method provided in the first aspect, and therefore can achieve a same beneficial effect as the method in the first aspect. Details are not described herein again in this embodiment of this application.

DESCRIPTION OF EMBODIMENTS

Figure 1:
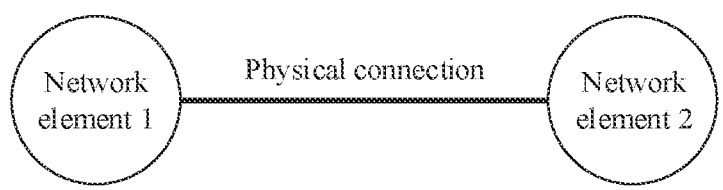
FIG. 1 is a schematic diagram of typical device joint networking.

A term such as "example" or "for example" is used for representing an example, an example illustration, or a description below. Any embodiment or design scheme described as an "example" or with "for example" in embodiments of this application should not be explained as being more preferred or having more advantages than another embodiment or design scheme. Exactly, use of the word "example", "for example", or the like is intended to present a related concept in a specific manner.

Currently, a plurality of devices can communicate with each other through joint networking. A device on a network is usually referred to as a network element. In a network including a plurality of network elements, one network element may communicate with only another network element on the network. For example, all network elements in networking are mobile phones. A mobile phone 1 and a mobile phone 2 may constitute a Bluetooth network by using a Bluetooth protocol. On the Bluetooth network, the mobile phone 1 may communicate with only the mobile phone 2. For another example, network elements in networking include a mobile phone and a personal computer (personal computer, PC). The mobile phone and the PC may constitute a Wi-Fi direct network by using a Wireless Fidelity (wireless fidelity, Wi-Fi) protocol. On the Wi-Fi direct network, the mobile phone may communicate with only the PC. For still another example, network elements in networking are a mobile phone and a PC. The mobile phone and the PC may constitute a network by using a Bluetooth protocol and a Wi-Fi protocol. On the network, the mobile phone may communicate with only the PC. One network element on the network may alternatively communicate with a plurality of (two or more) network elements on the network. For example, network elements in networking include an access point (access point, AP, for example, a Wi-Fi router) and a station (station, STA, for example, an electronic device such as a mobile phone, a PC, or a tablet computer). The AP and the plurality of STAs may constitute a Wi-Fi local area network by using a Wi-Fi protocol. On the Wi-Fi local area network, the AP may communicate with the plurality of STAs.

Communication between the network elements on the network may be implemented based on a physical connection directly or indirectly established wirelessly or wiredly. In a communication process, to ensure security of communication between two network elements, after the physical connection between the network elements is established, key negotiation usually further needs to be performed, to establish a data communication link between the network elements. For example, the foregoing Wi-Fi local area network is used as an example. The AP (for example, a Wi-Fi router) and each STA (for example, a mobile phone or a tablet computer) may complete key negotiation by using a four-way handshake, to establish a data communication link between the AP and the STA. The key obtained through negotiation may be used to encrypt and decrypt data transmitted between the AP and the STA.

In the conventional technology, after the connection such as the foregoing physical connection or the foregoing data communication link between the network elements is disconnected, if the network elements meet a condition for re-communication, a key negotiation process usually needs to be performed again to restore the data communication link between the network elements. Consequently, performing re-communication needs to consume a relatively long period of time. In addition, there may be a risk of failure. For example, key negotiation fails due to interference from a wireless signal. Consequently, the data communication link fails to be restored, and the network elements cannot communicate with each other again.

An embodiment of this application provides a data transmission method. If network elements have established a physical connection, and have performed a key negotiation process to complete establishment of a data communication link, after the connection such as the physical connection or the data communication link between the network elements is disconnected, if the network elements meet a condition for re-communication, the data communication link can be restored without performing the key negotiation process again between the network elements. This resolves a problem that the network elements need to consume a long period of time to communicate with each other again after the connection between the network elements is disconnected and the communication between the network elements is interrupted, and reduces a risk of failure.

It should be noted that the data transmission method provided in this embodiment of this application may be applied to various types of network systems. For example, the network system includes a network constituted through joint networking wirelessly. When joint networking is performed wirelessly, a used wireless communications protocol may be a Wi-Fi protocol, a Bluetooth (Bluetooth) protocol, a ZigBee protocol, a near field communication (near field communication, NFC) protocol, or the like. For another example, the network system includes a network constituted through joint networking wiredly, for example, by using a cable such as a power line or a network cable.

In addition, the network element (or referred to as a node, node) in this embodiment may be an electronic device (a specific structure of the electronic device is described below in detail in FIG. 2), may be an AP, or may be another network node. This is not specifically limited in this embodiment. The electronic device in this embodiment may be a mobile phone, a tablet computer, a desktop computer, a laptop computer, a handheld computer, a notebook computer, an ultra-mobile personal computer (ultra-mobile personal computer, UMPC), a netbook, a cellular phone, a personal digital assistant (personal digital assistant, PDA), a smart home device such as a desk lamp, a sound box, an air conditioner, a rice cooker, or a television set, or a device such as an augmented reality (augmented reality, AR)/virtual reality (virtual reality. VR) device, a wearable device, or a media player. The AP in this embodiment may be a Wi-Fi router, or may be an electronic device such as a mobile phone that can provide a Wi-Fi network. A specific device form of the network element on the network is not specially limited in this embodiment of this application.

The following describes implementations of embodiments of this application in detail with reference to accompanying drawings.

Figure 2:
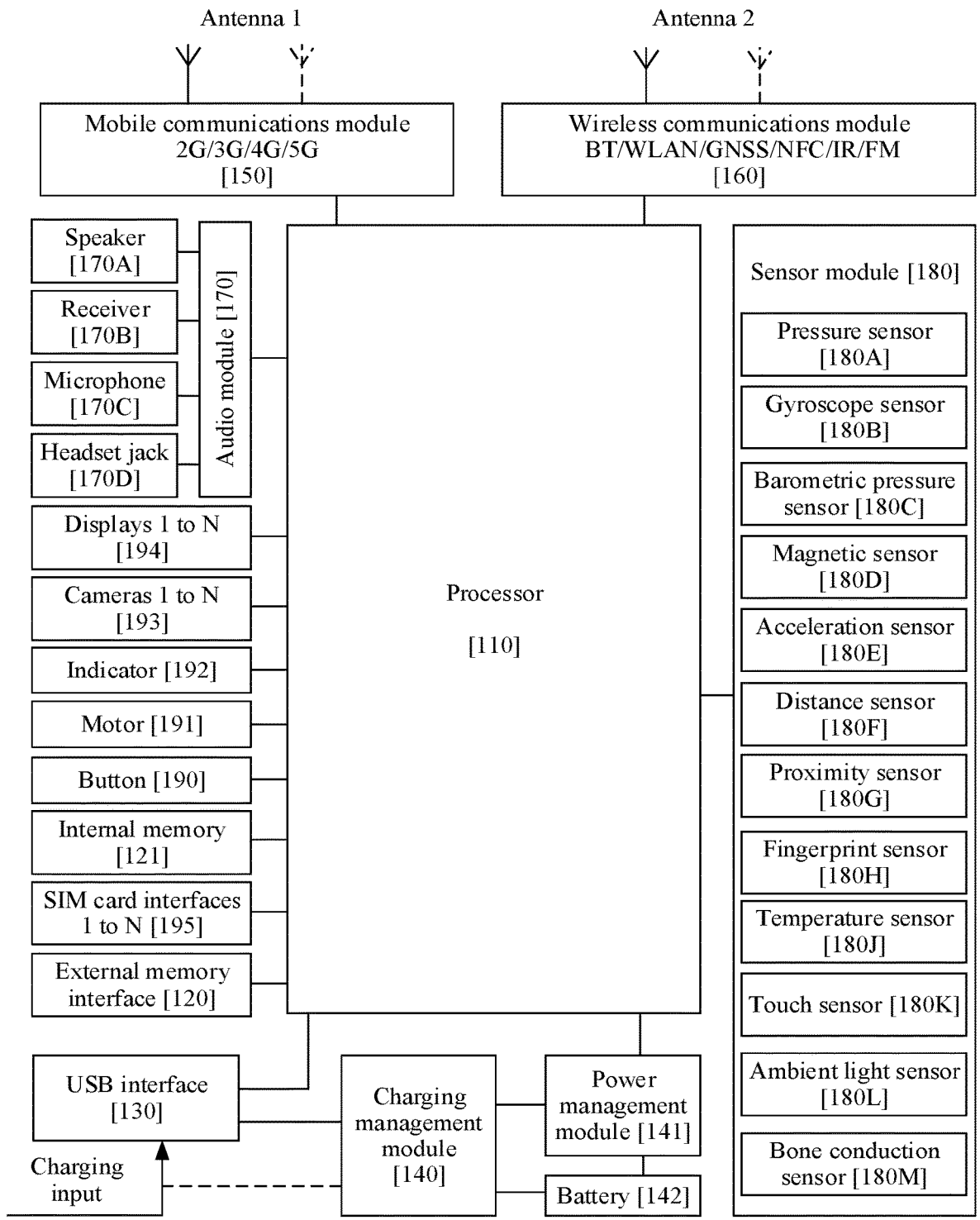
FIG. 2 is a schematic diagram of a structure of an electronic device according to an embodiment of this application.

FIG. 2 is a schematic diagram of a structure of an electronic device according to an embodiment of this application. As shown in FIG. 2, the electronic device may include a processor 110, an external memory interface 120, an internal memory 121, a universal serial bus (universal serial bus. USB) interface 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (subscriber identification module, SIM) card interface 195, and the like.

The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It can be understood that the structure shown in embodiments does not constitute a specific limitation on the electronic device. In some other embodiments, the electronic device may include more or fewer components than those shown in the figure, or some components may be combined, or some components may be split, or different component arrangements may be used. The components shown in the figure may be implemented through hardware, software, or a combination of software and hardware.

The processor 110 may include one or more processing units. For example, the processor 110 may include an application processor (application processor, AP), a modem processor, a graphics processor (graphics processing unit, GPU), an image signal processor (image signal processor, ISP), a controller, a memory, a video codec, a digital signal processor (digital signal processor, DSP), a baseband processor, a neural-network processor (neural-network processing unit, NPU), and/or the like. Different processing units may be independent devices, or may be integrated into one or more processors.

The controller may be a nerve center and a command center of the electronic device. The controller may generate an operation control signal based on instruction operation code and a time sequence signal, to control instruction fetching and instruction execution.

A memory may be further disposed in the processor 110, and is configured to store instructions and data. In some embodiments, the memory in the processor 110 is a cache. The memory may store instructions or data just used or cyclically used by the processor 110. If the processor 110 needs to use the instructions or the data again, the processor 110 may directly invoke the instructions or the data from the memory. This avoids repeated access and reduces a waiting time of the processor 110, and improves system efficiency.

In some embodiments, the processor 110 may include one or more interfaces. The interface may include an inter-integrated circuit (inter-integrated circuit. I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, an SIM interface, a USB interface, and/or the like.

The charging management module 140 is configured to receive a charging input from a charger. The charger may be a wireless charger, or may be a wired charger. The charging management module 140 may further supply power to the electronic device through the power management module 141 while charging the battery 142.

The power management module 141 is configured to connect to the battery 142, the charging management module 140, and the processor 110. The power management module 141 receives input of the battery 142 and/or the charging management module 140, and supplies power to the processor 110, the internal memory 121, an external memory, the display 194, the camera 193, the wireless communications module 160, and the like. In some other embodiments, the power management module 141 may alternatively be disposed in the processor 110. In some other embodiments, the power management module 141 and the charging management module 140 may alternatively be disposed in a same device.

A wireless communication function of the electronic device may be implemented through the antenna 1, the antenna 2, the mobile communications module 150, the wireless communications module 160, the modem processor, the baseband processor, and the like.

The antenna 1 and the antenna 2 are configured to transmit and receive electromagnetic wave signals. Each antenna of the electronic device may be configured to cover one or more communications frequency bands. Different antennas may be multiplexed, to improve antenna utilization. For example, the antenna 1 may be multiplexed as a diversity antenna of a wireless local area network. In some other embodiments, an antenna may be used in combination with a tuning switch.

The mobile communications module 150 may provide a solution that is applied to the electronic device and that includes wireless communications technologies such as 2G, 3G, 4G, and 5G. The mobile communications module 150 may include at least one filter, a switch, a power amplifier, a low noise amplifier (low noise amplifier, LNA), and the like. The mobile communications module 150 may receive an electromagnetic wave through the antenna 1, performs processing such as filtering or amplification on the received electromagnetic wave, and transmits a processed electromagnetic wave to the modem processor for demodulation. The mobile communications module 150 may further amplify a signal modulated by the modem processor, and convert an amplified signal into an electromagnetic wave for radiation through the antenna 1. In some embodiments, at least some function modules in the mobile communications module 150 may be disposed in the processor 110. In some embodiments, at least some functional modules of the mobile communications module 150 may be disposed in a same device as at least some modules of the processor 110.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor, and then transmitted to the application processor. The application processor outputs a sound signal by using an audio device (which is not limited to the speaker 170A, the receiver 170B, or the like), or displays an image or a video on the display 194. In some embodiments, the modem processor may be an independent component. In some other embodiments, the modem processor may be independent of the processor 110, and is disposed in the same device as the mobile communications module 150 or another functional module.

The wireless communications module 160 may provide a wireless communication solution that includes a wireless local area network (wireless local area network, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), NFC, an infrared (infrared, IR) technology, or the like and that is applied to the electronic device. The wireless communications module 160 may be one or more components integrating at least one communications processing module. The wireless communications module 160 receives an electromagnetic wave through the antenna 2, performs frequency modulation and filtering processing on the electromagnetic wave signal, and sends a processed signal to the processor 110. The wireless communications module 160 may further receive a to-be-sent signal from the processor 110, perform frequency modulation and amplification on the signal, and convert a processed signal into an electromagnetic wave for radiation through the antenna 2.

In some embodiments, in the electronic device, the antenna 1 and the mobile communications module 150 are coupled, and the antenna 2 and the wireless communications module 160 are coupled, so that the electronic device can communicate with a network and another device by using a wireless communications technology. The wireless communications technology may include a global system for mobile communications (global system for mobile communications, GSM), a general packet radio service (general packet radio service, GPRS), code division multiple access (code division multiple access, CDMA), broadband code division multiple access (wideband code division multiple access, WCDMA), time-division code division multiple access (time-division code division multiple access, TD-SCDMA), long term evolution (long term evolution, LTE). BT, a GNSS, a WLAN. NFC, FM, an IR technology, and/or the like. The GNSS may include a global positioning system (global positioning system. GPS), a global navigation satellite system (global navigation satellite system, GLONASS), a BeiDou navigation satellite system (Beidou navigation satellite system, BDS), a quasi-zenith satellite system (quasi-zenith satellite system. QZSS), and/or a satellite based augmentation system (satellite based augmentation systems, SBAS).

The electronic device implements the display function by using the GPU, the display 194, the application processor, and the like. The GPU is a microprocessor for image processing, and is connected to the display 194 and the application processor. The GPU is configured to: perform mathematical and geometric computation, and render an image. The processor 110 may include one or more GPUs that execute program instructions to generate or change display information.

The display 194 is configured to display an image, a video, and the like. The display 194 includes a display panel. The display panel may be a liquid crystal display (liquid crystal display, LCD), an organic light-emitting diode (organic light-emitting diode, OLED), an active-matrix organic light-emitting diode (active-matrix organic light emitting diode, AMOLED), a flexible light-emitting diode (flex light-emitting diode, FLED), a mini-LED, a micro-LED, a micro-OLED, a quantum dot light emitting diode (quantum dot light emitting diodes, QLED), or the like. In some embodiments, the electronic device may include one or N displays 194, where N is a positive integer greater than 1.

The electronic device may implement a photographing function by using the ISP, the camera 193, the video codec, the GPU, the display 194, the application processor, and the like.

The ISP is configured to process data fed back by the camera 193. The camera 193 is configured to capture a static image or a video. An optical image of an object is generated through lens, and is projected to a photosensitive element. The photosensitive element may be a charge coupled device (charge coupled device, CCD) or a complementary metal-oxide-semiconductor (complementary metal-oxide-semiconductor. CMOS) phototransistor. The photosensitive element converts an optical signal into an electrical signal, and then transmits the electrical signal to the ISP for converting the electrical signal into a digital image signal. The ISP outputs the digital image signal to the DSP for processing. The DSP converts the digital image signal into an image signal in a standard format, for example, RGB or YUV. In some embodiments, the electronic device may include one or N cameras 193, where N is a positive integer greater than 1.

The external memory interface 120 may be configured to connect to an external storage card, for example, a micro SD card, to extend a storage capability of the electronic device. The external memory card communicates with the processor 110 through the external memory interface 120, to implement a data storage function. For example, files such as music and videos are stored in the external memory card.

The internal memory 121 may be configured to store computer-executable program code. The executable program code includes instructions. The processor 110 runs the instructions stored in the internal memory 121, to perform various function applications of the electronic device and data processing. For example, in this embodiment of this application, the processor 110 may store, by executing the instructions stored in the internal memory 121, a key that needs to be used to transmit an i$^{th}$ frame of data and keys used for transmitting j frames of data before the i$^{th}$ frame of data, and store identification information of the i$^{th}$ frame of data and connection status information when determining that a preset condition is met. In this way, after a connection to a peer network element is disconnected and communication is interrupted, if a condition for re-communication is met, the processor 110 may use the stored key, the identification information of the i$^{th}$ frame of data, and the connection status information to continue communication. The internal memory 121 may include a program storage area and a data storage area. The program storage area may store an operating system, an application program (for example, a sound playing function or an image playing function) required by at least one function, and the like. The data storage area may store data (such as audio data and a phone book) created when the electronic device is used, and the like. In addition, the internal memory 121 may include a high speed random access memory, or may include a non-volatile memory, for example, at least one magnetic disk storage device, a flash storage device, or a universal flash storage (universal flash storage, UFS).

The electronic device may implement audio functions, for example, music playing and recording, by using the audio module 170, the speaker 170A, the receiver 170B, the microphone 170C, the headset jack 170D, the application processor, for example, implement a music playback function and a recording function.

The audio module 170 is configured to convert digital audio information into an analog audio signal for output, and is also configured to convert an analog audio input into a digital audio signal. The audio module 170 may be configured to code and decode an audio signal. In some embodiments, the audio module 170 may be disposed in the processor 110, or some function modules of the audio module 170 are disposed in the processor 110.

The speaker 170A, also referred to as a "loudspeaker", is configured to convert an audio electrical signal into a sound signal. The electronic device may be used to listen to music or answer a hands-free call by using the speaker 170A.

The receiver 170B, also referred to as an "earpiece", is configured to convert an audio electrical signal into a sound signal. When a call is answered or voice information is received by using the electronic device, the telephone receiver 170B may be put close to a human ear to receive a voice.

The microphone 170C, also referred to as a "mike" or a "mic", is configured to convert a sound signal into an electrical signal. When making a call or sending voice information, a user may make a sound near the microphone 170C through the mouth of the user, to enter a sound signal to the microphone 170C. At least one microphone 170C may be disposed in the electronic device.

The headset jack 170D is configured to connect to a wired headset.

The pressure sensor 180A is configured to sense a pressure signal, and can convert the pressure signal into an electrical signal. In some embodiments, the pressure sensor 180A may be disposed on the display 194. There are many types of pressure sensors 180A, for example, a resistive pressure sensor, an inductive pressure sensor, and a capacitive pressure sensor. When a touch operation is performed on the display 194, the electronic device detects strength of the touch operation by using the pressure sensor 180A. The electronic device may further calculate a touch position based on a detection signal of the pressure sensor 180A.

The gyro sensor 180B may be configured to determine a motion posture of the electronic device. The gyroscope sensor 180B may be configured to implement image stabilization during photographing. The gyroscope sensor 180B may be used in a navigation scenario and a motion-sensing game scenario. The barometric pressure sensor 180C is configured to measure barometric pressure. In some embodiments, the electronic device calculates an altitude based on a barometric pressure value measured by the barometric pressure sensor 180C, to assist in positioning and navigation. The magnetic sensor 180D includes a Hall sensor. The electronic device may detect opening and closing of a flip cover by using the magnetic sensor 180D. The acceleration sensor 180E may detect magnitude of accelerations in various directions (usually on three axes) of the electronic device. The distance sensor 180F is configured to measure a distance. In a photographing scenario, the electronic device may measure a distance by using the distance sensor 180F, to implement quick focusing.

The optical proximity sensor 180G may include, for example, a light-emitting diode (LED) and an optical detector such as a photodiode. The light-emitting diode may be an infrared light-emitting diode. The electronic device emits infrared light by using the light-emitting diode. The electronic device detects reflected infrared light from a nearby object by using the photodiode. When detecting sufficient reflected light, the electronic device may determine that there is an object near the electronic device. When detecting insufficient reflected light, the electronic device may determine that there is no object near the electronic device. The electronic device may detect, by using the optical proximity sensor 180G, that the user holds the electronic device close to an ear for a call, to automatically turn off a screen for power saving. The proximity sensor 180G may also be configured to automatically unlock and lock a screen in a flip cover mode and a pocket mode.

The ambient light sensor 180L is configured to sense ambient light brightness. The electronic device may adaptively adjust brightness of the display 194 based on the sensed ambient light brightness. The ambient light sensor 180L may also be configured to automatically adjust white balance during photographing. The ambient light sensor 180L may further cooperate with the optical proximity sensor 180G to detect whether the electronic device is in a pocket, to avoid an unintentional touch.

The fingerprint sensor 180H is configured to collect a fingerprint. The electronic device may use a feature of the collected fingerprint to implement fingerprint-based unlocking, application lock access, fingerprint-based photographing, fingerprint-based call answering, and the like.

The temperature sensor 180J is configured to detect a temperature. In some embodiments, the electronic device executes a temperature processing policy by using the temperature detected by the temperature sensor 180J. The touch sensor 180K is also referred to as a "touch panel". The touch sensor 180K may be disposed on the display 194, and the touch sensor 180K and the display 194 constitute a touchscreen, which is also referred to as a "touchscreen". The touch sensor 180K is configured to detect a touch operation performed on or near the touch sensor 180K. The touch sensor may transfer the detected touch operation to the application processor to determine a type of a touch event. The display 194 may provide a visual output related to the touch operation. In some other embodiments, the touch sensor 180K may alternatively be disposed on a surface of the electronic device, and is located at a position different from that of the display 194.

The bone conduction sensor 180M may obtain a vibration signal. In some embodiments, the bone conduction sensor 180M may obtain a vibration signal of a vibration bone of a human vocal-cord part. The bone conduction sensor 180M may also be in contact with a human pulse, to receive a blood pressure beating signal, and the like. The button 190 includes a power button, a volume button, and the like. The button 190 may be a mechanical button, or may be a touch key. The electronic device may receive a button input, and generate a button signal input related to user settings and function control of the electronic device.

The motor 191 may generate a vibration prompt. The motor 191 may be configured to produce an incoming call vibration prompt and a touch vibration feedback. The indicator 192 may be an indicator light, and may be configured to indicate a charging status and a power change, or may be configured to indicate a message, a missed call, a notification, and the like.

The SIM card interface 195 is configured to connect to a SIM card. The SIM card may be inserted into the SIM card interface 195 or removed from the SIM card interface 195, to implement contact with or be separated from the electronic device. The electronic device may support one or N SIM card interfaces, where N is a positive integer greater than 1. The electronic device interacts with a network by using the SIM card, to implement functions such as calling and data communication. In some embodiments, the electronic device uses an eSIM, namely, an embedded SIM card. The eSIM card may be embedded into the electronic device, and cannot be separated from the electronic device.

All methods in the following embodiments may be implemented in the electronic device having the foregoing hardware structure.

With reference to the accompanying drawings, the following describes in detail a data transmission method provided in embodiments of this application. In embodiments, the method may include an "initial connection establishment" procedure and a "connection restoration" procedure.

Figure 3:
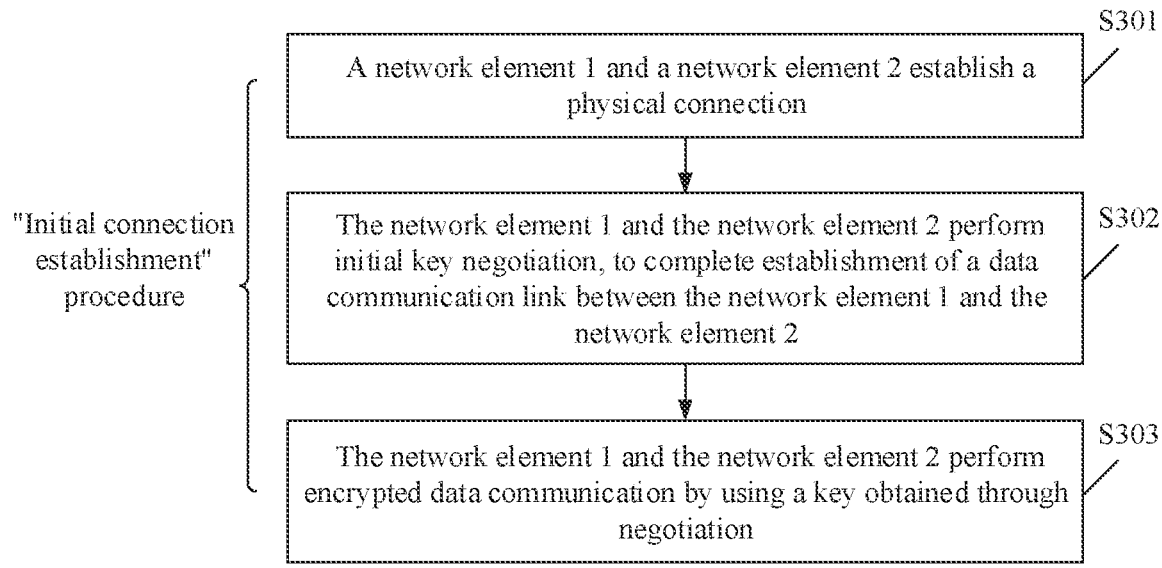
FIG. 3 is a schematic flowchart of a data transmission method according to an embodiment of this application.

As shown in FIG. 3, the "initial connection establishment" procedure may include S301 to S303.

S301: A network element 1 and a network element 2 establish a physical connection.

The network element 1 and the network element 2 may establish the physical connection wirelessly or wiredly. For example, the physical connection is established wiredly. After a cable such as a network cable is connected between the network element 1 and the network element 2, the physical connection between the network element 1 and the network element 2 is successfully established. For another example, the physical connection is established wirelessly. When the network element 1 is located in a wireless network radiation area of the network element 2, or the network element 2 is located in a wireless network radiation area of the network element 1, the physical connection between the network element 1 and the network element 2 is successfully established.

S302: The network element 1 and the network element 2 perform initial key negotiation, to complete establishment of a data communication link between the network element 1 and the network element 2.

After the physical connection between the network element 1 and the network element 2 is established, to ensure communication security, the network element 1 and the network element 2 may perform initial key negotiation, to complete establishment of the data communication link between the network element 1 and the network element 2.

For example, the network element 1 is an AR and the network element 2 is a STA. When the STA is located in a wireless network radiation area of the AP, a physical connection between the AP and the STA is successfully established. Then, the AP and the STA may perform initial key negotiation by using a four-way handshake.

For example, the AP and the STA complete initial key negotiation based on a wireless application protocol (wireless application protocol, WAP). The initial key negotiation process may include the following steps:

Step 1: After the physical connection between the AP and the STA is established, the AP sends a random number AN (Anonce) to the STA based on the physical connection. The STA may obtain the random number AN and an authenticator MAC (Authenticator MAC, AM) address based on a message from the AP. Then, the STA may determine a pairwise transient key (PTK) based on the random number AN and the AM with reference to a random number SN (Snonce), a supplicant MAC (Supplicant MAC, SM) address, and a pairwise master key (PMK) that are generated by the STA.

Step 2: The STA sends the random number SN (Snonce) and a message integrity code (message integrity code, MIC) to the AP based on the physical connection between the AP and the STA. After receiving a message from the STA, the AP checks integrity of the received message based on the MIC, and may obtain the random number SN and the SM after the check succeeds. Then, the AP may determine a group transient key (GTK) based on the random number SN and the SM with reference to the random number AN, the AM, and the PMK that are generated by the AP and perform step 3.

Step 3: The AP sends the MIC and the GTK determined in step 2 to the STA. After receiving the message from the AP, the STA checks integrity of the received message based on the MIC, checks, based on the received GTK, whether the PTK determined in step 1 is correct, and performs step 4 after determining that the PTK determined in step 1 is correct.

Step 4: The STA sends an ACK to the AP, and performs encryption by using the PTK determined in step 1. Then, the process of initial key negotiation between the AP and the STA is completed, and the data communication link between the AP and the STA is successfully established.

The foregoing example describes the process of initial key negotiation between the network elements by using an example in which the network elements complete initial key negotiation based on the WAP. When the network elements communicate with each other by using another communications protocol, initial key negotiation may alternatively be implemented based on another process. A specific process of initial key negotiation between the network elements is not limited herein in this embodiment of this application.

S303: The network element 1 and the network element 2 perform encrypted data communication by using a key obtained through negotiation.

After the data communication link between the network element 1 and the network element 2 is established, the network element 1 and the network element 2 may perform encrypted data communication based on the established data communication link by using the key obtained through negotiation.

Still with reference to the example in S302, the PTK determined in step 1 and the GTK determined in step 2 are keys obtained by the AP and the STA through negotiation, and may be used to encrypt and decrypt data transmitted between the AP and the STA, for example, may be used to encrypt and decrypt a first frame of transmitted data. A key for subsequent data transmission may be determined based on a key used for transmitting a previous frame of data or keys used for transmitting several previous frames of data.

Figure 5:
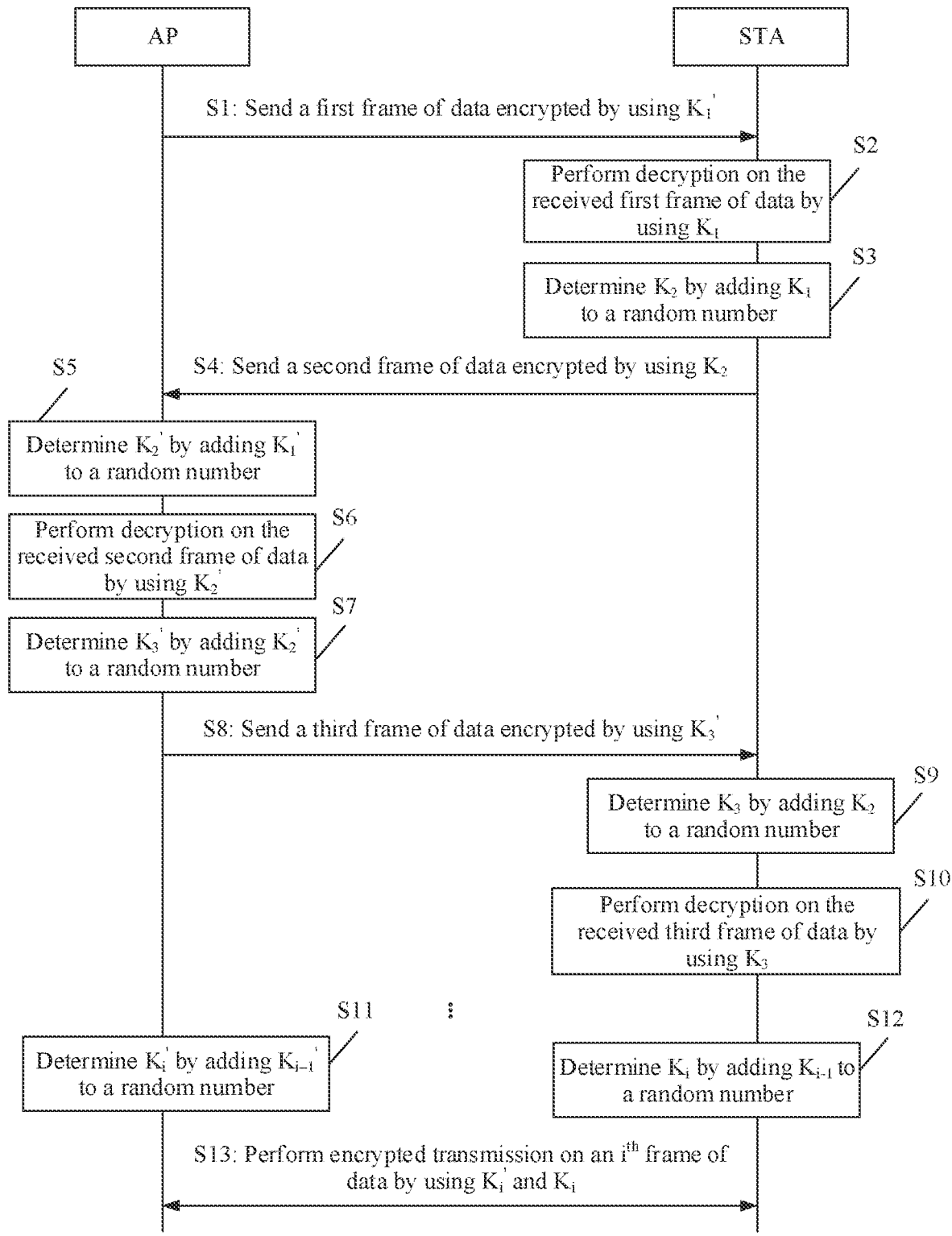
FIG. 5 is a schematic diagram of encrypted data transmission according to an embodiment of this application.

For example, with reference to FIG. 5, a key used for transmitting a next frame of data is determined based on a key used for transmitting a previous frame of data. The PTK determined in step 1 is referred to as $K_1$, and the GTK determined in step 2 is referred to as $K_1'$. After the data communication link between the AP and the STA is successfully established, the AP and the STA may transmit the first frame of data by using $K_1$ and $K_1'$. As shown in S1 in FIG. 5, the AP sends the first frame of data to the STA, where the first frame of data is encrypted by using the GTK obtained through negotiation in S302, that is, $K_1'$. After the STA receives the first frame of data, as shown in S2 in FIG. 5, the STA performs decryption by using the PTK obtained through negotiation in S302, that is, $K_1$.

Then, when a second frame of data needs to be transmitted between the AP and the STA, the AP and the STA may determine, based on respective keys used for transmitting the first frame of data, a key used for transmitting the second frame of data, and transmit the second frame of data by using the determined key. As shown in S3 in FIG. 5, the STA determines $K_2$ by adding $K_1$ to a random number. As shown in S4 in FIG. 5, the STA sends the second frame of data to the AP, where the second frame of data is encrypted by using $K_2$. As shown in S5 in FIG. 5, the AP determines $K_2'$ by adding $K_1'$ to a random number. When receiving the second frame of data, as shown in S6 in FIG. 5, the AP performs decryption by using $K_2$.

Next, the AP and the STA may determine, based on respective keys used for transmitting the second frame of data, a key used for transmitting a third frame of data, and transmit the third frame of data by using the determined key. As shown in S7 in FIG. 5, the AP determines $K_3'$ by adding $K_2'$ to a random number. As shown in S8 in FIG. 5, the STA sends the third frame of data to the STA, where the third frame of data is encrypted by using $K_3'$. As shown in S9 in FIG. 5, the STA determines $K_3$ by adding $K_2$ to a random number. When receiving the third frame of data, as shown in S10 in FIG. 5, the AP performs decryption by using $K_3$.

By analogy, the AP and the STA may determine, based on respective keys that need to be used for transmitting an $(i-1)^{th}$ frame of data, a key used for transmitting an $i^{th}$ frame of data, and transmit the $i^t$ frame of data by using the determined key. As shown in S11 in FIG. 5, the AP determines $K_i'$ by adding $K_{i-1}'$ to a random number. As shown in S12 in FIG. 5, the STA determines $K_i$ by adding $K_{i-1}$ to a random number. In this way, as shown in S13 in FIG. 5, the AP and the STA may perform encrypted transmission on the $i^{th}$ frame of data by using $K_i'$ and $K_i$.

Figure 4:
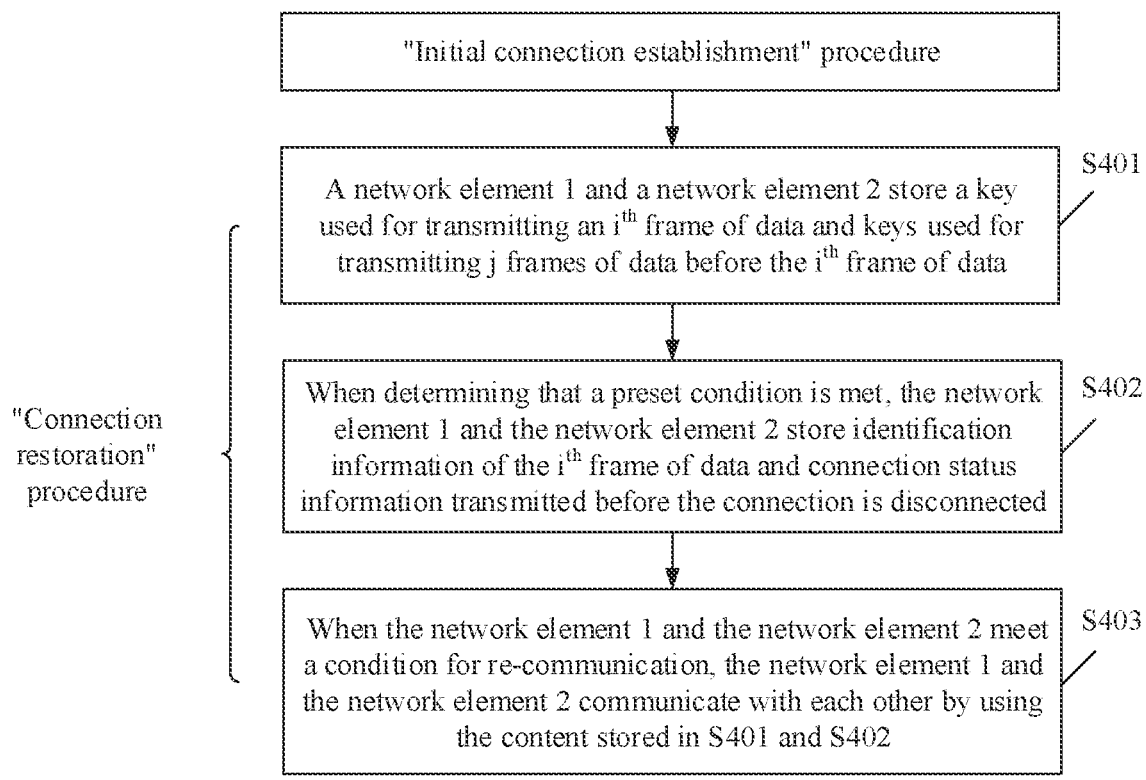
FIG. 4 is another schematic flowchart of a data transmission method according to an embodiment of this application.

It may be understood that, in a process of communication between the network element 1 and the network element 2, the connection between the network element 1 and the network element 2 may be disconnected. The connection may be the physical connection or the data communication link. For example, if the cable connected between the network element 1 and the network element 2 is disconnected, or the network element 2 leaves the wireless network radiation area of the network element 1, the physical connection between the network element 1 and the network element 2 is disconnected. Certainly, if the physical connection between the network element 1 and the network element 2 is disconnected, the data communication link is also disconnected. For another example, one of the network element 1 and the network element 2 sends disconnection signaling used to disconnect the data communication link between the network element 1 and the network element 2 to the other, and then the data communication link between the network element 1 and the network element 2 is disconnected. After the connection between the network element 1 and the network element 2 is disconnected, the communication between the network element 1 and the network element 2 stops. In this embodiment of this application, to quickly restore the data communication link if a condition for re-communication is met after the connection between the network element 1 and the network element 2 is disconnected, the method further includes the "connection restoration" procedure. As shown in FIG. 4, the "connection restoration" procedure includes S401 to S403.

S401: A network element 1 and a network element 2 store a key used for transmitting an $i^{th}$ frame of data and keys used for transmitting j frames of data before the $i^{th}$ frame of data.

Herein, i is an integer greater than or equal to 1, and j is a value greater than or equal to 0 and less than or equal to i−1. In an example, after generating a key required for transmitting data, a network element (for example, the network element 1 or the network element 2) may store the generated key. For example, after generating a key used for transmitting an $i^{th}$ frame of data, the network element 1 stores the generated key. For another example, after generating a key used for transmitting an $(i-1)^{th}$ frame of data, the network element 1 may store the generated key. In addition, the network element may store only a key for a currently transmitted frame of data and keys for j frames of data before the currently transmitted frame of data.

It may be understood that, when data transmission is performed between network elements, a key used for transmitting a current frame of data may be determined based on a key used for transmitting a previous frame of data or keys used for transmitting several previous frames of data. Therefore, to quickly restore a data communication link when a condition for re-communication is met after a connection between network elements is disconnected, the network element (the network element 1 or the network element 2) may store the key that needs to be used for transmitting the $i^{th}$ frame of data, and store the keys used for transmitting the j frames of data before the $i^{th}$ frame of data.

Still with reference to the example in S303, the network element 1 such as the AP performs S401. The AP may store keys $[K_{i-j}', K_i']$. The network element 2 such as the STA performs S401. The STA may store keys $[K_{i-j}, K_i]$.

A value range of j is [0, i−1]. For example, j is 0. The AP stores the key $K_i'$, and the STA stores the key $K_i$. For another example, j is 2. The AP stores keys $K_{i-2}', K_{i-1}'$, and $K_i'$, and the STA stores keys $K_{i-2}, K_{i-1}$, and $K_i$.

It should be noted that the key used for transmitting the $i^{th}$ frame of data is a first key in this application, and the key used for transmitting each of j frames of data before the $i^{th}$ frame of data is a second key in this application.

S402: When determining that a preset condition is met, the network element 1 and the network element 2 store identification information of the $i^{th}$ frame of data and connection status information transmitted before the connection is disconnected.

The $i^{th}$ frame of data is the last frame of data transmitted before the connection (for example, a physical connection or a data communication link) between the network element 1 and the network element 2 is disconnected. The identification information of the $i^t$ frame of data stored in the network element 1 and the network element 2 may include various information required for data transmission between the network elements. The identification information of the $i^{th}$ frame of data and the connection status information transmitted before the connection is disconnected are used to generate data when re-communication needs to be performed after the connection is disconnected. For example, the network element 1 and the network element 2 perform joint networking by using a Wi-Fi protocol. The identification information of the $i^{th}$ frame of data may include a frame sequence number, a sequence control field, and the like. The connection status information may include a quantity of received and sent frames, a connection status, and the like. The frame sequence number is used to indicate a sequence number of the $i^{th}$ frame of data transmitted between the network element 1 and the network element 2. For example, a frame sequence number i is used to indicate that the $i^{t}$h frame of data is an $i^{th}$ frame transmitted between the network element 1 and the network element 2. The frame control field may include a protocol version (protocol version) field, a type field, and the like. The protocol version field is used to indicate a protocol version followed by the $i^{th}$ frame of data. The type field is used to indicate that the $i^{th}$ frame of data is a management frame, a data frame, or a control frame, and is further used to indicate a subtype of the $i^{th}$ frame of data. The quantity of received and sent frames is a quantity of frames transmitted between the network element 1 and the network element 2 until the $i^{th}$ frame of data. The connection status may be connected or authenticated, and is used to indicate that the network element 1 and the network element 2 are connected and authenticated.

It should be noted that, in this embodiment of this application, both the network element 1 and the network element 2 need to perform S402. In other words, w % ben determining that the preset condition is met, both the network element 1 and the network element 2 need to perform an operation of storing the identification information of the $i^{th}$ frame of data and the connection status information transmitted before the connection is disconnected. For ease of description, an example in which the network element 1 performs S402 is used below for description.

In some embodiments, the preset condition may be that the data communication link between the network element 1 and the network element 2 is disconnected. In other words, when determining that the data communication link between the network element 1 and the network element 2 is disconnected, the network element 1 stores the last frame of data transmitted before the connection is disconnected, that is, the identification information of the $i^{th}$ frame of data and the connection status information transmitted before the connection is disconnected.

For example, when notifying the network element 2 to disconnect the data communication link or receiving a notification of disconnecting the data communication link from the network element 2, the network element 1 may determine that the data communication link between the network element 1 and the network element 2 is disconnected. In this case, the network element 1 stores identification information of the last frame of data that is transmitted before the connection is disconnected and the connection status information transmitted before the connection is disconnected.

For example, after the network element 1 sends the $i^{th}$ frame of data to the network element 2, or after the network element 1 receives the $i^{th}$ frame of data from the network element 2, the network element 1 sends disconnection signaling to the network element 2. The disconnection signaling is used to indicate to disconnect the connection such as the data communication link between the network element 1 and the network element 2. After the network element 1 sends the disconnection signaling to the network element 2, the network element 1 and the network element 2 disconnect the data communication link between the network element 1 and the network element 2. In this case, when sending the disconnection signaling, the network element 1 may store the identification information of the last frame of data, that is, the $i^{th}$ frame of data, that is transmitted before the connection is disconnected and the connection status information transmitted before the connection is disconnected. For another example, after the network element 1 sends the $i^{th}$ frame of data to the network element 2, or after the network element 1 receives the $i^{th}$ frame of data from the network element 2, the network element 1 receives the disconnection signaling from the network element 2. After the network element 1 receives the disconnection signaling from the network element 2, the network element 1 and the network element 2 disconnect the data communication link between the network element 1 and the network element 2. Therefore, when receiving the disconnection signaling from the network element 2, the network element 1 may store the identification information of the last frame of data, that is, the $i^{th}$ frame of data, that is transmitted before the connection is disconnected and the connection status information transmitted before the connection is disconnected. The disconnection signaling may be signaling complying with a wireless communications protocol used for joint networking of the network element 1 and the network element 2. For example, the network element 1 and the network element 2 perform joint networking by using a Wi-Fi protocol, and the disconnection signaling may be a disassoc frame or a deauth frame defined in the Wi-Fi protocol.

In some other embodiments, the preset condition may be that the physical connection between the network element 1 and the network element 2 is disconnected. To be specific, when determining that the physical connection between the network element 1 and the network element 2 is disconnected, the network element 1 stores the identification information of the last frame of data, that is, the $i^{th}$ frame of data, that is transmitted before the connection is disconnected and the connection status information transmitted before the connection is disconnected.

For example, in a process of transmitting data between the network element 1 and the network element 2, if the network element 2 voluntarily leaves, for example, a wired connection cable is disconnected, or if the network element 2 leaves a wireless network radiation area of the network element 1 during a wireless connection, but the network element 2 does not notify the network element 1 by using corresponding disconnection signaling, a physical connection between the network element 1 and the network element 2 is disconnected. The network element 1 may determine a time for performing communication last time, a sent frame fails for a long time, or the like, to determine whether the physical connection between the network elements is disconnected. After determining that the physical connection between the network elements is disconnected, the network element 1 may store the identification information of the last frame of data that is transmitted before the connection is disconnected and the connection status information transmitted before the connection is disconnected. For example, after the network element 1 sends the $i^{th}$ frame of data to the network element 2, if the network element 1 determines that response data returned by the network element 2 is not received within a preset time, it indicates that the physical connection between the network element 1 and the network element 2 is disconnected. In this case, the network element 1 may store the identification information of the last frame of data, that is, the $i^{th}$ frame of data, that is transmitted before the connection is disconnected and the connection status information transmitted before the connection is disconnected. For another example, after the network element 1 receives the $i^{th}$ frame of data from the network element 2, if the network element 1 determines that no other data from the network element 2 is received within a preset time, it indicates that the physical connection between the network element 1 and the network element 2 is disconnected. In this case, the network element 1 may store the identification information of the last frame of data, that is, the $i^{th}$ frame of data, that is transmitted before the connection is disconnected and the connection status information transmitted before the connection is disconnected.

In some other embodiments, the preset condition may be that a storage periodicity is reached. To be specific, the network element 1 may periodically store identification information of data transmitted between the network element 1 and the network element 2, and connection status information, to ensure that after the connection between the network element 1 and the network element 2 is disconnected, the network element 1 stores the identification information of the last frame of data, that is, the $i^{th}$ frame of data, that is transmitted before the connection is disconnected and the connection status information transmitted before the connection is disconnected.

When determining that the preset condition is met, the network element 2 also stores the identification information of the last frame of data that is transmitted before the connection is disconnected and the connection status information transmitted before the connection is disconnected. Due to peer-to-peer communication, information stored in the network element 2 is the same as that stored in the network element 1, that is, the network element 2 also stores the identification information of the $i^{th}$ frame of data and the connection status information that are transmitted before the connection is disconnected. In addition, in this embodiment, descriptions of determining, by the network element 2, whether the preset condition is met are similar to the descriptions of determining, by the network element 1, whether the preset condition is met. Details are not described again in this embodiment.

S403: When the network element 1 and the network element 2 meet the condition for re-communication, the network element 1 and the network element 2 communicate with each other by using the content stored in S401 and S402.

For example, the network element 1 and the network element 2 are disconnected after transmitting the $i^{th}$ frame of data. As described in S401 and S402, before the connection between the network element 1 and the network element 2 is disconnected, both the network element 1 and the network element 2 store the key that needs to be used to transmit the $i^{th}$ frame of data, the keys used for transmitting j frames of data before the $i^{t}$ frame of data, the identification information of the $i^{th}$ frame of data, and the connection status information transmitted before the connection is disconnected. When the network element 1 and the network element 2 meet the condition for re-communication, the network element 1 and the network element 2 may directly communicate with each other by using the content stored in S401 and S402. In other words, the data communication link can be restored for re-communication without performing key negotiation, that is, without performing step 1 to step 4 in S302.

If the network element 1 and the network element 2 stop communicating with each other because the physical connection is disconnected, when the physical connection between the network element 1 and the network element 2 is restored, for example, when the cable between the network element 1 and the network element 2 is reconnected, or when the network element 2 returns to the wireless network radiation area of the network element 1, it may be determined that the network element 1 and the network element 2 meet the condition for re-communication. If the network element 1 and the network element 2 stop communicating with each other because the data communication link is disconnected, when connection signaling is received or sent between the network element 1 and the network element 2, it may be determined that the network element 1 and the network element 2 meet the condition for re-communication. The connection signaling is used to indicate to establish a connection between a first network element and a second network element. The connection signaling may be signaling complying with a wireless communications protocol used for joint networking of the network element 1 and the network element 2. For example, the network element 1 and the network element 2 perform joint networking by using a Wi-Fi protocol, and the connection signaling may be an assoc frame or an auth frame defined in the Wi-Fi protocol.

For example, the physical connection between the AP and the STA is disconnected and the communication is stopped, with reference to the example in S401, before the connection is disconnected, the AP stores the keys [$K_{i-j}'$, $K_i'$], and the STA stores the keys [$K_{i-j}$, $K_i$]. In addition, both the AP and the STA store the identification information of the $i^{th}$ frame of data, for example, the frame sequence number, the sequence control field, and the connection status information transmitted before the connection is disconnected, for example, the quantity of received and sent frames (for example, the quantity of received and sent frames is i), and the connection status (connected or authenticated).

When the AP and the STA meet the condition for re-communication, for example, when a cable between the AP and the STA is reconnected, or when the STA returns to a wireless network radiation area of the AP, the AP and the STA may continue to communicate with each other by using the stored key, the identification information of the $i^{th}$ frame of data, and the connection status information transmitted before the connection is disconnected.

For example, the AP needs to transmit data to the STA. The AP may use the stored keys [$K_{i-j}'$, $K_i'$] to generate a new key $K_{i+1}'$. For example, if j=0, the AP generates the new key $K_{i+1}'$ by adding the stored key $K_i'$ to a random number. For another example, if j=2, the AP generates the new key $K_{i+1}'$ by using the stored keys $K_{i-2}'$, $K_{i-1}'$, and $K_i'$, and a random number. Then, the AP generates an $(i+1)^{th}$ frame of data by using the stored frame sequence number of the $i^{th}$ frame data, sequence control field, quantity of received and sent frames (for example, the quantity of received and sent frames is i), and connection status (connected or authenticated), encrypts the $(i+1)^{th}$ frame of data by using $K_{i+1}'$, and sends the encrypted $(i+1)^{th}$ frame of data to the STA.

In addition, the STA may use the stored keys [$K_{i-j}'$, $K_i'$] to generate a new key $K_{i+1}$. For example, if j=0, the STA generates the new key $K_{i+1}$ by adding the stored key $K_i$ to a random number. For another example, if j=2, the STA generates the new key $K_{i+1}$ by using the stored keys $K_{i-2}$, $K_{i-1}$, and $K_i$, and a random number. Then, the STA decrypts the $(i+1)^{th}$ frame of data from the AP by using $K_{i+1}$. In addition, the STA may further generate response data of the $(i+1)^{th}$ frame of data based on the stored frame sequence number of the $i^{th}$ frame of data, sequence control field, quantity of received and sent frames (for example, the quantity of received and sent frames is i), and connection status (connected or authenticated), and sends the response data to the AP. The response data is used to indicate whether the $(i+1)^{th}$ frame of data is successfully received.

Figure 6:
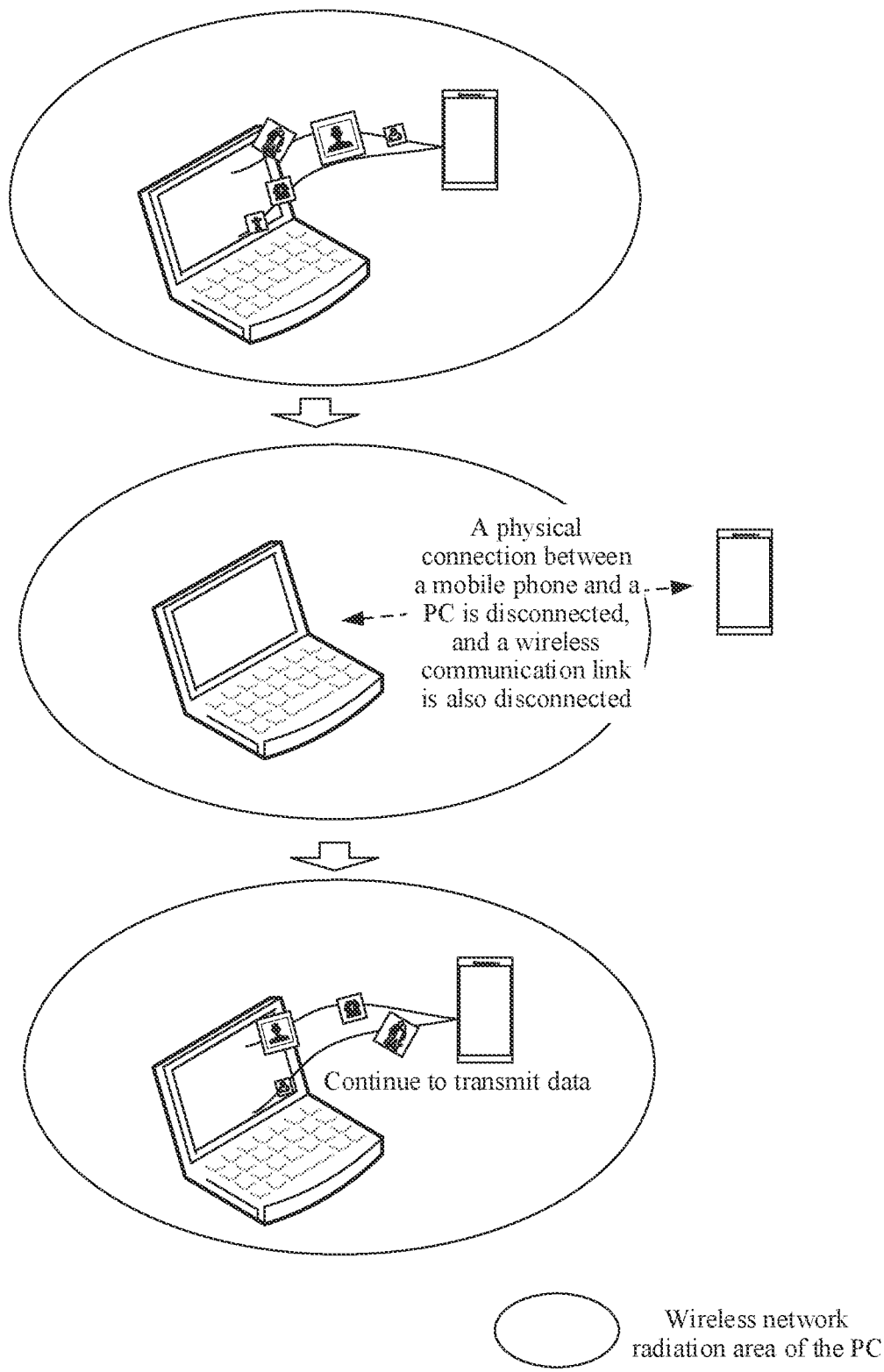
FIG. 6 is a schematic diagram of a data transmission scenario according to an embodiment of this application.

The following illustrates the solution in this embodiment with reference to a specific example. For example, with reference to FIG. 6, a mobile phone and a PC constitute a Wi-Fi direct network by using a Wi-Fi protocol. On the Wi-Fi direct network, the mobile phone communicates with the PC. When a user approaches the PC at home with the mobile phone, the mobile phone is in a wireless network radiation area of the PC, and a physical connection between the mobile phone and the PC is successfully established. The user may enable a Wi-Fi direct function (such as a Huawei share function) on the mobile phone and PC. Then, the mobile phone and PC may perform initial key negotiation to establish a data communication link between the mobile phone and the PC. For example, the user wants to transmit a photo in the mobile phone to the PC. The mobile phone may perform encrypted data communication with the PC by using a key obtained through negotiation, that is, transmit the photo in the mobile phone to the PC in encryption mode. In a transmission process, if the user leaves home with the mobile phone, that is, the mobile phone leaves the wireless network radiation area of the PC, a physical connection between the mobile phone and the PC is disconnected, and a wireless communication link is also disconnected. The mobile phone and the PC may separately store identification information of a last frame of data (for example, an $i^{th}$ frame of data) transmitted between the mobile phone and the PC and connection status information transmitted before the connection is disconnected, and store a key used for transmitting the $i^{th}$ frame of data and keys (for example, [$K_{i-j}'$, $K_i'$]) used for transmitting j frames of data before the $i^{th}$ frame of data. In this way, after the user returns home and the physical connection between the mobile phone and the PC is restored, the key negotiation process does not need to be performed again. The mobile phone and the PC may continue to perform encrypted transmission on the photo by using the stored keys [$K_{i-j}'$, $K_i'$], identification information of the $i^{th}$ frame of data, and connection status information transmitted before the connection is disconnected.

According to the data transmission method provided in this embodiment of this application, network elements have established a physical connection, and have performed a key negotiation process. After a data communication link is established, a used key, identification information of a last frame of data that is transmitted before the connection is disconnected, and connection status information transmitted before the connection is disconnected are stored in a process of communication between the network elements, so that when a condition for re-communication is met after the connection between the network elements is disconnected, the data communication link can be restored without performing the key negotiation process again. This resolves a problem that the network elements need to consume a long period of time to communicate with each other again after the connection between the network elements is disconnected, and reduces a risk of failure.

Some other embodiments of this application further provide a computer-readable storage medium. The computer-readable storage medium may include computer instructions. When the computer instructions are run on a network element, for example, the network element 1 or the network element 2, the network element performs corresponding steps in the data transmission method in the embodiment shown in FIG. 3, FIG. 4, or FIG. 5.

Some other embodiments of this application further provide a computer program product. When the computer program product is run on a computer, the computer performs corresponding steps in the data transmission method in the embodiment shown in FIG. 3, FIG. 4, or FIG. 5.

Some other embodiments of this application further provide an apparatus. The apparatus has a function of implementing behavior of the network element such as the network element 1 or the network element 2 in the method shown in FIG. 3, FIG. 4, or FIG. 5. The function may be implemented by hardware, or may be implemented by executing corresponding software by hardware. The hardware or the software includes one or more modules corresponding to the foregoing functions, for example, a storage unit or module, a generating unit or module, a communications unit or module, and a determining unit or module.

The foregoing descriptions about implementations allow a person skilled in the art to understand that, for the purpose of convenient and brief description, division of the foregoing functional modules is taken as an example for illustration. In actual application, the foregoing functions can be allocated to different modules and implemented according to a requirement, that is, an inner structure of an apparatus is divided into different functional modules to implement all or some of the functions described above.

In the several embodiments provided in this application, it should be understood that the disclosed apparatus and method may be implemented in other manners. For example, the described apparatus embodiments are merely examples. For example, division of the modules or units is merely logical function division, and may be other division during actual implementation. For example, a plurality of units or components may be combined or may be integrated into another apparatus, or some features may be ignored or not performed. In addition, the displayed or discussed mutual couplings or direct couplings or communication connections may be implemented through some interfaces. The indirect couplings or communication connections between the apparatuses or units may be implemented in an electrical form, a mechanical form, or another form.

The units described as discrete components may or may not be physically separate, and components displayed as units may be one or more physical units, that is, may be located in one place, or may be distributed to a plurality of different places. The embodiment solutions may be implemented by selecting some or all of the units based on actual requirements.

In addition, functional units in embodiments of this application may be integrated into one processing unit, each of the units may exist alone physically, or two or more units may be integrated into one unit. The integrated unit may be implemented in a form of hardware, or may be implemented in a form of a software function unit.

When the integrated unit is implemented in the form of a software functional unit and sold or used as an independent product, the integrated unit may be stored in a readable storage medium. Based on such an understanding, the technical solutions in embodiments of this application essentially, or the part contributing to the conventional technology, or all or some of the technical solutions may be implemented in a form of a software product. The software product is stored in a storage medium and includes several instructions for instructing a device (which may be a single-chip microcomputer, a chip, or the like) or a processor (processor) to perform all or some of the steps of the methods described in embodiments of this application. The foregoing storage medium includes any medium that can store program code, such as a USB flash drive, a removable hard disk, a read-only memory (read-only memory, ROM), a random access memory (random access memory, RAM), a magnetic disk, or an optical disc.

The foregoing description is merely a specific implementation of this application, but is not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A data transmission method, applied to a first network element, wherein the first network element and a second network element have successfully established a connection, and have completed initial key negotiation, and the method comprises:
in response to determining that the connection between the first network element and the second network element is disconnected, storing, by the first network element, identification information of an $i^{th}$ frame of data and connection status information transmitted before the connection is disconnected, wherein i is an integer greater than or equal to 1, the $i^{th}$ frame of data is the last frame of data transmitted between the first network element and the second network element before the connection is disconnected;
in response to determining that the first network element and the second network element meet a condition for re-communication, generating, by the first network element, a third key based on a first key and a second key that are stored in the first network element, wherein the first key is a key used to transmit the $i^{th}$ frame of data, and the second key comprises a key used by the first network element and the second network element to transmit each of j frames of data before the $i^{th}$ frame of data, and j is an integer greater than or equal to 0 and less than or equal to i−1; and
communicating, by the first network element, with the second network element based on the third key, the identification information of the $i^{th}$ frame of data, and the connection status information.

2. The method according to claim 1, wherein:
in response to determining that the first network element sends disconnection signaling to the second network element, the first network element determines that the connection is disconnected.

3. The method according to claim 2, wherein that the first network element and the second network element meet a condition for re-communication comprises:
the first network element sends connection signaling to the second network element.

4. The method according to claim 1, wherein:
in response to determining that the first network element receives disconnection signaling sent by the second network element, the first network element determines that the connection is disconnected.

5. The method according to claim 4, wherein that the first network element and the second network element meet a condition for re-communication comprises:
the first network element receives connection signaling from the second network element.

6. The method according to claim 1, wherein:
in response to determining that response data returned by the second network element is not received within a preset time after the first network element sends the $i^{th}$ frame of data to the second network element, the first network element determines that the connection is disconnected; or
in response to determining that data sent by the second network element is not received within a preset time after the first network element receives the $i^{th}$ frame of data sent by the second network element, the first network element determines that the connection is disconnected.

7. The method according to claim 6, wherein that the first network element and the second network element meet a condition for re-communication comprises:
the first network element is connected to the second network element through a cable, or the second network element is located in a wireless network radiation area of the first network element.

8. The method according to claim 1, wherein the communicating, by the first network element, with the second network element based on the third key, the identification information of the $i^{th}$ frame of data, and the connection status information comprises:
generating, by the first network element, an $(i+1)^{th}$ frame of data based on the identification information of the $i^{th}$ frame of data and the connection status information, encrypting the $(i+1)^{th}$ frame of data by using the third key, and sending encrypted $(i+1)^{th}$ frame of data to the second network element; or
receiving, by the first network element, an $(i+1)^{th}$ frame of data from the second network element, decrypting the $(i+1)^{th}$ frame of data by using the third key, generating response data of the $(i+1)^{th}$ frame of data based on the identification information of the $i^{th}$ frame of data and the connection status information, and sending the response data to the second network element, wherein the response data is used to indicate whether the $(i+1)^{th}$ frame of data is successfully received.

9. The method according to claim 1, wherein:
the identification information of the $i^{th}$ frame of data comprises: a frame sequence number and a sequence control field; and
the connection status information comprises: a quantity of received and sent frames and a connection status, and the connection status is used to indicate that the first network element is connected to the second network element.

10. A first network element, wherein the first network element has successfully established a connection with a second network element, and has completed initial key negotiation with the second network element, and the first network element comprises:
at least one hardware processor;
one or more memories coupled to the at least one hardware processor and storing programming instructions for execution by the at least one hardware processor to perform operations comprising:
in response to determining that the connection between the first network element and the second network element is disconnected, storing, by the first network element, identification information of an $i^{th}$ frame of data and connection status information transmitted before the connection is disconnected, wherein i is an integer greater than or equal to 1, the $i^{th}$ frame of data is the last frame of data transmitted between the first network element and the second network element before the connection is disconnected;

in response to determining that the first network element and the second network element meet a condition for re-communication, generating, by the first network element, a third key based on a first key and a second key that are stored in the first network element, wherein the first key is a key used to transmit the $i^{th}$ frame of data, and the second key comprises a key used by the first network element and the second network element to transmit each of j frames of data before the $i^{th}$ frame of data, and j is an integer greater than or equal to 0 and less than or equal to i−1; and communicating, by the first network element, with the second network element based on the third key, the identification information of the $i^{th}$ frame of data, and the connection status information.

11. The first network element according to claim 10, wherein:

in response to determining that the first network element sends disconnection signaling to the second network element, the first network element determines that the connection is disconnected.

12. The first network element according to claim 10, wherein:

in response to determining that the first network element receives disconnection signaling sent by the second network element, the first network element determines that the connection is disconnected.

13. The first network element according to claim 10, wherein:

in response to determining that response data returned by the second network element is not received within a preset time after the first network element sends the $i^{th}$ frame of data to the second network element, the first network element determines that the connection is disconnected; or in response to determining that data sent by the second network element is not received within a preset time after the first network element receives the $i^{th}$ frame of data sent by the second network element, the first network element determines that the connection is disconnected.

14. The first network element according to claim 10, wherein the communicating, by the first network element, with the second network element based on the third key, the identification information of the $i^{th}$ frame of data, and the connection status information comprises:

generating, by the first network element, an $(i+1)^{th}$ frame of data based on the identification information of the $i^{th}$ frame of data and the connection status information, encrypting the $(i+1)^{th}$ frame of data by using the third key, and sending encrypted $(i+1)^{th}$ frame of data to the second network element; or receiving, by the first network element, an $(i+1)^{th}$ frame of data from the second network element, decrypting the $(i+1)^{th}$ frame of data by using the third key, generating response data of the $(i+1)^{th}$ frame of data based on the identification information of the $i^{th}$ frame of data and the connection status information, and sending the response data to the second network element, wherein the response data is used to indicate whether the $(i+1)^{th}$ frame of data is successfully received.

15. The first network element according to claim 10, wherein:

the identification information of the $i^{th}$ frame of data comprises: a frame sequence number and a sequence control field; and the connection status information comprises: a quantity of received and sent frames and a connection status, and the connection status is used to indicate that the first network element is connected to the second network element.

16. A non-transitory computer-readable storage medium, comprising computer instructions, wherein when the computer instructions are run on a first network element, the first network element is enabled to perform a method, wherein the first network element has successfully established a connection with a second network element, and has completed initial key negotiation with the second network element, and the method comprising:

in response to determining that the connection between the first network element and the second network element is disconnected, storing, by the first network element, identification information of an $i^{th}$ frame of data and connection status information transmitted before the connection is disconnected, wherein i is an integer greater than or equal to 1, the $i^{th}$ frame of data is the last frame of data transmitted between the first network element and the second network element before the connection is disconnected;

in response to determining that the first network element and the second network element meet a condition for re-communication, generating, by the first network element, a third key based on a first key and a second key that are stored in the first network element, wherein the first key is a key used to transmit the $i^{th}$ frame of data, and the second key comprises a key used by the first network element and the second network element to transmit each of j frames of data before the $i^{th}$ frame of data, and j is an integer greater than or equal to 0 and less than or equal to i−1; and communicating, by the first network element, with the second network element based on the third key, the identification information of the $i^{th}$ frame of data, and the connection status information.

17. The non-transitory computer-readable storage medium according to claim 16, wherein the method comprises:

in response to determining that the first network element sends disconnection signaling to the second network element, determining, by the first network element, that the connection is disconnected.

18. The non-transitory computer-readable storage medium according to claim 16, wherein the method comprises:

in response to determining that the first network element receives disconnection signaling sent by the second network element, determining, by the first network element, that the connection is disconnected.

19. The non-transitory computer-readable storage medium according to claim 16, wherein the method comprises:

in response to determining that response data returned by the second network element is not received within a preset time after the first network element sends the $i^{th}$ frame of data to the second network element, determining, by the first network element, that the connection is disconnected; or in response to determining that data sent by the second network element is not received within a preset time after the first network element receives the $i^{th}$ frame of data sent by the second network element, determining, by the first network element, that the connection is disconnected.

20. The non-transitory computer-readable storage medium according to claim 16, wherein the communicating, by the first network element, with the second network element based on the third key, the identification information of the $i^{th}$ frame of data, and the connection status information comprises:

generating, by the first network element, an $(i+1)^{th}$ frame of data based on the identification information of the $i^{th}$ frame of data and the connection status information, encrypting the $(i+1)^{th}$ frame of data by using the third key, and sending encrypted $(i+1)^{th}$ frame of data to the second network element; or by the first network element, an $(i+1)^{th}$ frame of data from the second network element, decrypting the $(i+1)^{th}$ frame of data by using the third key, generating response data of the $(i+1)^{th}$ frame of data based on the identification information of the $i^{th}$ frame of data and the connection status information, and sending the response data to the second network element, wherein the response data is used to indicate whether the $(i+1)^{th}$ frame of data is successfully received.

* * * * *

UNITED STATES PATENT AND TRADEMARK OFFICE
CERTIFICATE OF CORRECTION

Page 1 of 1

PATENT NO. : 12,262,198 B2
APPLICATION NO. : 17/868416
DATED : March 25, 2025
INVENTOR(S) : Chong Zhu, Feng Liu and Zhipeng Wu It is certified that error appears in the above-identified patent and that said Letters Patent is hereby corrected as shown below:

In the Claims

In Column 27, In Line 19, In Claim 20, before "by" insert -- receiving, --.

Signed and Sealed this
Twenty-second Day of July, 2025

Coke Morgan Stewart
*Acting Director of the United States Patent and Trademark Office*